2 Sheets—Sheet 1.

W. GILMAN.

CORN-SHELLER.

No. 7,422. Reissued Dec. 12, 1876.

*Witnesses:*

W. B. Masson

W. E. Chaffee

*Inventor:*

William Gilman by E. E. Masson atty

N. PETERS, PHOTO-LITHOGRAPHER WASHINGTON, D. C.

W. GILMAN.

CORN-SHELLER.

No. 7,422. Reissued Dec. 12, 1876.

*Witnesses:*

W. B. Masson

W. E. Chaffee

*Inventor:*

William Gilman by E. E. Masson atty

THE GRAPHIC CO. N.Y.

UNITED STATES PATENT OFFICE

WILLIAM GILMAN, OF CHICAGO, ILLINOIS.

IMPROVEMENT IN CORN-SHELLERS.

Specification forming part of Letters Patent No. 55,485, dated June 12, 1866; reissue No. 7,422, dated December 12, 1876; application filed July 13, 1876.

*To all whom it may concern:*

Be it known that I, WILLIAM GILMAN, formerly of Ottawa, in the county of La Salle and State of Illinois, but now residing in Chicago, in the county of Cook and State aforesaid, have invented certain new and useful Improvements in Corn-Shellers; and that the following is a full, clear, and exact description of the same, reference being had to the accompanying drawings, making a part of this specification, in which—

Figure 1:
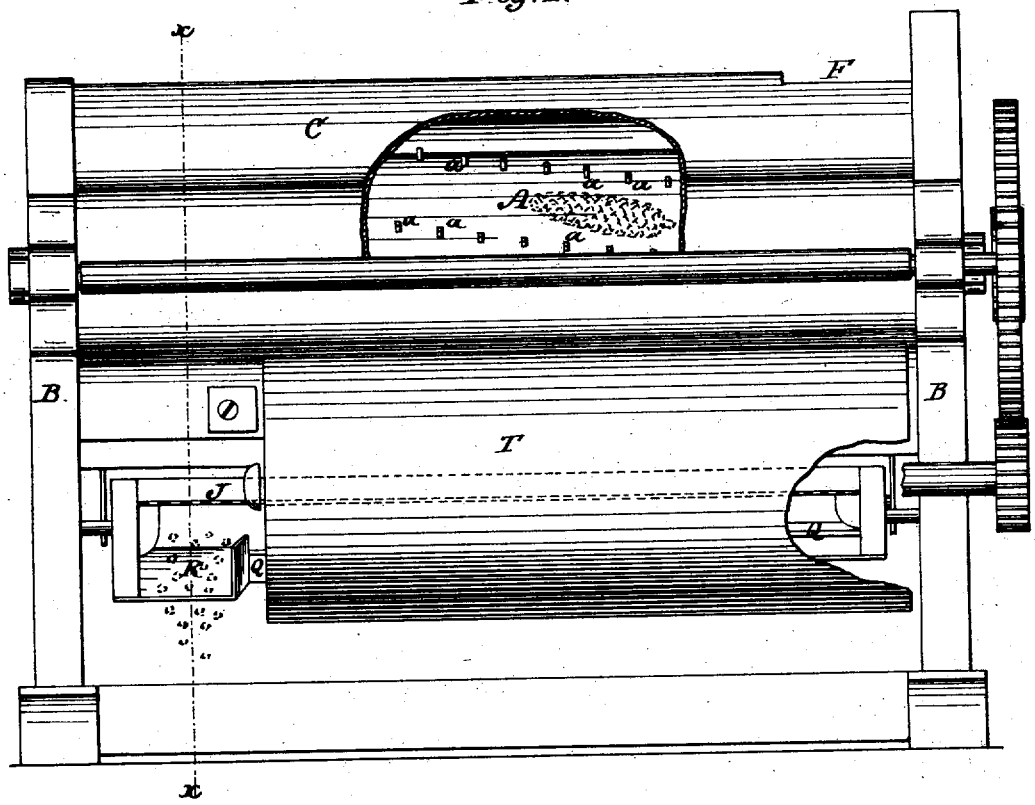
Figure 2:
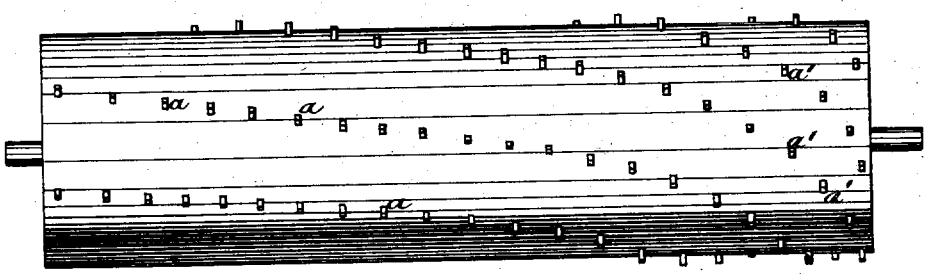
Figure 3:
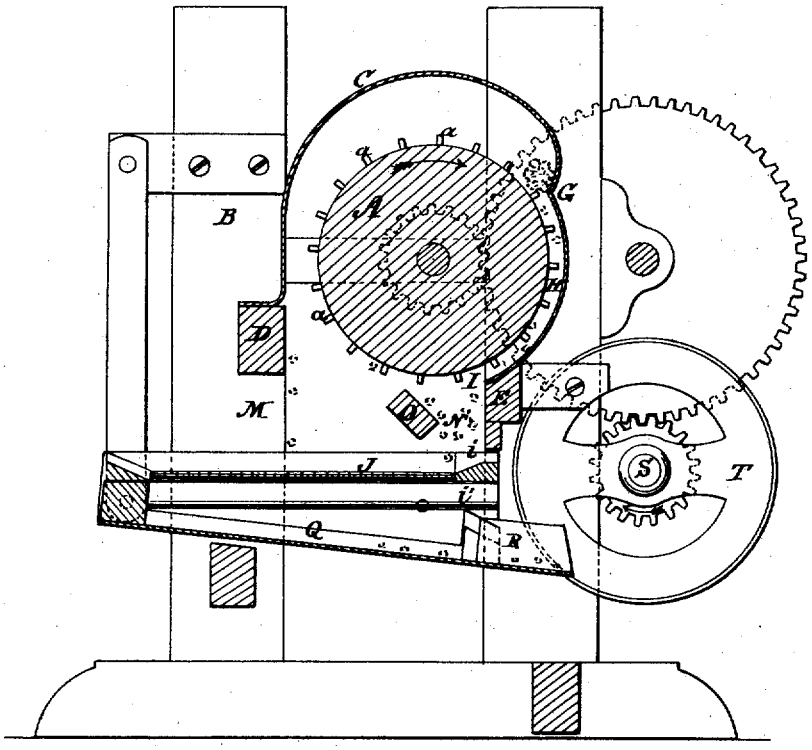

Figure 1 represents an elevation of the rear side of the corn-sheller, with a portion of the casing surrounding its toothed cylinder represented as broken away to show a portion of said cylinder within said casing. Fig. 2 represents the shelling-cylinder removed from the machine to show the mode of arranging the teeth thereon. Fig. 3 represents a vertical transverse section through the machine, taken at the line *x x* of Fig. 1.

Similar letters of reference, where they occur, denote like parts of the machine in all the figures.

My invention relates to the several arrangements or combinations of mechanisms, as follows: the arrangement of the teeth upon the shelling-cylinder—viz., in spiral lines having sharp curves at or near the feeding-in hopper, to carry the ears rapidly away from that point, and then continuing nearer to a straight line, to advance the corn more slowly and at the most desirable inclination against the shelling-rib; a primary rail or deflector to stop the shelled corn and turn it onto the riddle; in connection with the first rail, board, or deflector, a second rail or deflector for catching and turning such of the shelled corn as may pass the first one and direct it onto the riddle; the combination of the deflector or deflectors with the screen and fan-blower; the delivery of the shelled corn beneath and behind the fan-case.

The shelling-cylinder is represented at A, and is supported in end pieces B B of the frame. The teeth *a a a* of the cylinder are peculiarly arranged thereon—as, for instance, at that end of the machine where the corn is fed in they are set in a sharp curve, as at *a'*, so as to rapidly take away the corn from this point and prevent its choking, and also to direct and carry it against the shelling-rib G, said teeth curving in that direction. Behind these sharp curves of teeth the rows gradually fall off into more elongated spirals. C is a casing surrounding the upper portion of the cylinder A, and secured to the frame of the machine, and said casing and the frame-pieces to which it is attached extend downward on both sides of the cylinder, so as to inclose it, except to about one-quarter of its circumference, more or less, so as to allow the shelled corn to drop through. There is an opening, F, in the case C, through which the ears of corn to be shelled are fed to the shelling-cylinder in the casing, and upon the casing there is a rib, G, against which the ears of corn are carried and retained until the cylinder takes off the grains, they being rotated on their long axes by the shelling-cylinder, and the corn is driven down through the passage H, between the cylinder and the casing, upon the horizontal screen or riddle J, to which a vibratory movement can be imparted in any proper manner, the cob passing out of the casing at the opposite end of the cylinder to that at which it had been fed in the sheller. It is intended to revolve the toothed cylinder with great rapidity, and, consequently, in order to prevent the corn shelled by it, as explained, from striking the screen or riddle J with such force and at such an angle that, in rebounding therefrom, it will fly out of the sheller through the opening M, between the front rail D of the concave and the top surface of the riddle, I have arranged in front of the opening I, where the corn escapes from the casing, and only a short distance from it, a horizontal rail or deflecting-board, O, extending the whole length of the machine, and serves as a barrier or stop to the passage of the corn as it escapes from the opening I, arresting and so deflecting it as to cause it to fall through the opening N upon the riddle or screen J with very little force and momentum. The grains of corn that are carried over this deflecting-board O by the revolution of the cylinder are projected against the front rail D of the casing, from which they are deflected to the riddle.

By means of the two deflectors O and D, arranged as above explained with reference to the opening I, through which the corn escapes to the screen, it is plain to be seen that there is no possibility of the corn being thrown out of the sheller by the momentum imparted to it from the revolution of the toothed cylinder, it being all made thereby to fall upon the screen, through the openings or perforations of which it passes to the inclined plane Q below, that has a delivery-spout, R, adjacent to the side of the fan-case for discharging it into suitable receptacles to receive and hold it. The corn, while upon such screen, is agitated by the vibrating of the same, and also subjected to currents or blasts of air produced by the rapid revolution of a suitable fan-blower, S, placed within the casing T, behind the sheller, which currents of air, passing through the openings *i i'*, just above and below the rear edge of the screen, separate and blow all refuse matter mixed with the corn out through the opening M below the front rail D, as is obvious without further explanation. The fan-shaft and the cylinder are driven, by means of gears, directly from the large gear-wheel located between the two; but either of them may be connected directly with the driving-power independently of the other.

Having thus fully described the construction and operation of the corn-sheller, I claim as new and desire to secure by Letters Patent—

1. In a corn-sheller, a shelling-cylinder having its teeth arranged in spiral lines, commencing in sharp curves at or near the feeding-hopper, to carry the ears rapidly away from that point, and then continuing nearer to a straight line, to advance the corn more slowly and at the most desirable inclination against the shelling-rib, substantially as and for the purpose described.

2. The primary rail or deflector O, arranged between the cylinder and riddle, opposite to the discharge point of the concave, to stop the shelled corn and turn it into the riddle, substantially as shown and described.

3. In combination with the shelling-cylinder and its concave, and the first rail or deflector O, a second rail or deflector, D, for catching and turning such of the shelled corn as may pass the first one, and direct it onto the riddle, substantially as described.

4. The combination of the deflector or deflectors and shelling-cylinder, receiving the corn at the end farthest from the final discharge, with the screen and fan-blower, when arranged together so as to operate substantially as described, and for the purpose set forth.

5. In combination with the deflector or deflectors, the screen, and the fan-blower of a corn-sheller, the delivery-spout R for the shelled corn beneath and behind the fan-case, substantially as and for the purpose described.

WILLIAM GILMAN.

Witnesses:
W. B. MASSON,
E. E. MASSON.